United States Patent [19]

Sasakawa

[11] Patent Number: 4,697,214

[45] Date of Patent: Sep. 29, 1987

[54] TAPE LOADING DEVICE

[75] Inventor: Hirotaka Sasakawa, Tachikawa, Japan

[73] Assignee: Casio Computer Co., Ltd., Tokyo, Japan

[21] Appl. No.: 788,252

[22] Filed: Oct. 17, 1985

[30] Foreign Application Priority Data

Dec. 18, 1984 [JP] Japan .............................. 59-191662[U]
Dec. 18, 1984 [JP] Japan .............................. 59-191666[U]

[51] Int. Cl.$^4$ ............................................. G11B 5/027
[52] U.S. Cl. ................................... 360/85; 360/130.23
[58] Field of Search ............................... 360/85, 130.23

[56] References Cited

U.S. PATENT DOCUMENTS 4,583,136 4/1986 Tsuchida ............................. 360/85
4,620,245 10/1986 Shimizu ............................... 360/85

Primary Examiner—S. J. Heinz
Attorney, Agent, or Firm—Frishauf, Holtz, Goodman & Woodward

[57] ABSTRACT

A tape loading device in which a tape is drawn from a tape cassette and wound on a rotary head cylinder, said device comprises a guide rail member formed substantially in an arcuate shape along the outer periphery of the rotary head cylinder having a guide slot including a curved point raised at the outside in the intermediate portion, first and second movable members each having at least one engaging portion guided to the guide slot of the guide rail member and movably supported at two front and rear positions in the guide slot of the guide rail member, first and second tape guide members aligned corresponding to the first and second movable members and introduced into the inside of the exposed tape of the tape cassette at the mounting time of the tape cassette, first drive mechanism coupled by the first movable member for transmitting a drive power for moving the first movable member from the initial loading position opposite to the mounting position of the tape cassette in the center of the guide slot to the end of the guide slot to become the loading finished position, and a second drive mechanism coupled with the second movable member for transmitting drive power for moving the second movable member from the initial loading position opposite to the mounting position of the tape cassette in the guide slot to the intermediate portion of the guide slot to become the loading finished position.

14 Claims, 26 Drawing Figures

F I G. 16
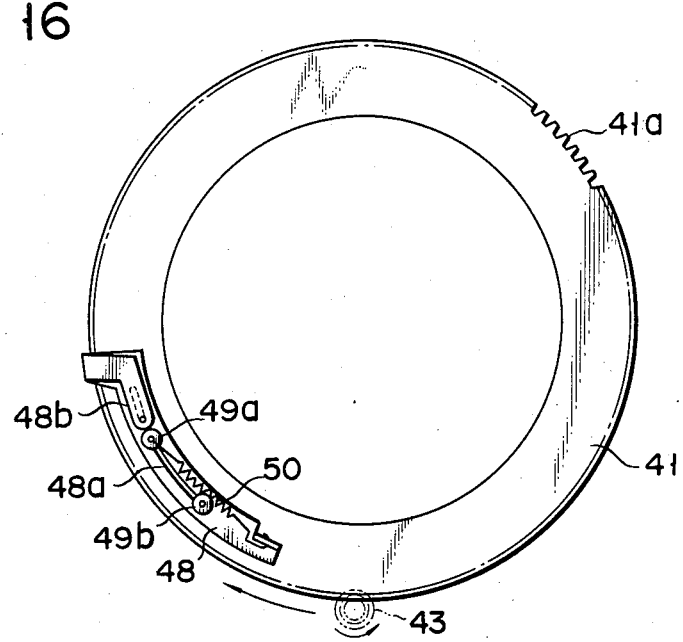
F I G. 17
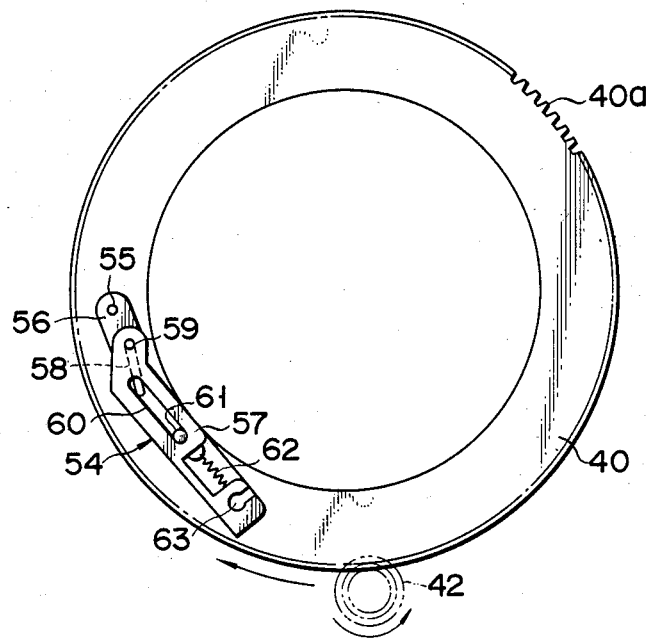

F I G. 26
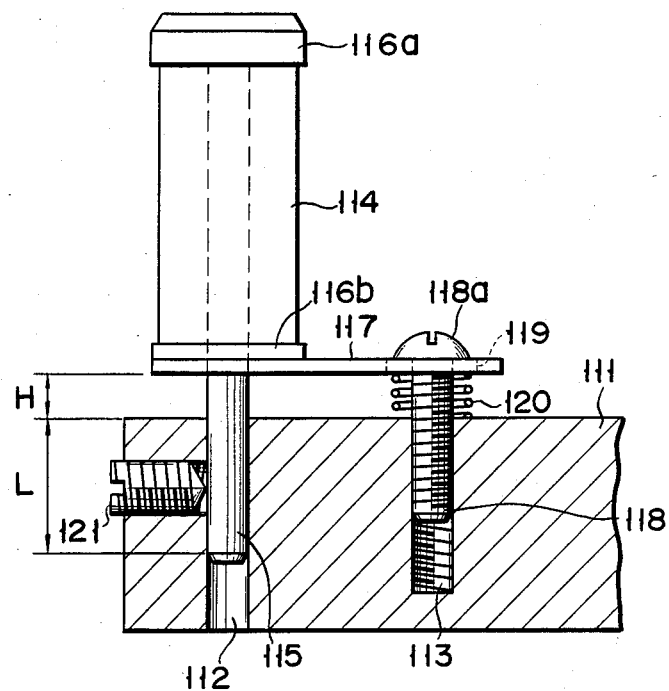

TAPE LOADING DEVICE

BACKGROUND OF THE INVENTION

This invention relates to a tape loading device and, more particularly, to a tape loading device adapted for a video tape recorder, for example, of 8 mm type.

Recently, a 8 mm video tape recorder (hereinafter referred to as "a VTR") which used a magnetic tape having 8 mm of width has been developed as a VTR.

This 8 mm VTR has large advantages due to the use of narrow (8 mm) magnetic tape, and its cassette, therefore, has substantially the same size (95 mm×62.5 mm×15 mm) as a compact audio cassette, thereby having reduced size and the weight.

Various sorts of tape loading types in this 8 mm VTR were heretofore considered, and a U-shaped loading type in which the tape is wound substantially in a U-shape on a rotary head cylinder is representative.

FIGS. 1 to 3 show a conventional tape loading device of U-shaped loading type. FIG. 1 is the initial state before loading, FIG. 2 is the intermediate state of loading, and FIG. 3 is the completed state of loading.

In FIGS. 1 to 3, reference numeral 1 denotes a tape cassette. A magnetic tape 2 wound on a supply side reel and a takeup side reel is contained in the cassette 1. This tape 2 is exposed in the recess formed on the front surface of the case. The cassette 1 is mounted as shown in FIG. 1 in the state that the loading device is disposed in the initial state.

This loading device draws the tape 2 from the mounted cassette 1 and winds the tape 2 on a rotary head cylinder 10, and the loading device is constructed as below.

In FIGS. 1 to 3, reference numeral 11 denotes a guide rail provided to surround the outer periphery of the head cylinder 10. A guide slot 12 is formed over the entire length of the upper surface of the guide rail 11.

Reference numeral 13 designates a movable element supported onto the guide rail 11 and slidably moving on the guide rail 10. Two large and small guide rollers 14 and 15 are stood longitudinally on the element 13. Reference numeral 16 depicts a loading ring provided at the lower side of the guide rail 11. The ring 16 is rotatably driven by a drive mechanism, not shown.

The element 13 is coupled through the guide slot 12 of the guide rail 11 with the ring 16, and moves on the rail 11 in the loading direction by the rotation of the ring 16. The element 13 is disposed at the initial position opposed to the mounting position of the cassette 1 as shown in FIG. 1 in the initial state. When the cassette 1 is mounted in this initial state, two rollers 14 and 15 on the element 13 become engaged within the exposed tape of the cassette 1.

When the ring 16 is rotated in a direction of the arrow as shown in FIG. 2 in the state that the cassette 1 is mounted in this manner, the element 13 moves on the rail 11 in the rotating direction of the ring 16, i.e., in the loading direction, the tape 2 is drawn by the large-diameter guide roller 14 at the front side of the element, and drawn from the cassette 1. This tape 2 is wound on the cylinder 10 upon moving of the element 13.

An arcuate movable member 17 which moves reversely to the rotating direction of the ring 16 by a drive mechanism, not shown, is provided outside the ring 16. A pinch roller 19 for pressing the tape 2 on a capstan 18 is provided at the end of the member 17. The roller 19 is disposed inside the exposed tape of the cassette 1 mounted in the initial state, moves the member 17 in a reverse direction to the loading direction upon rotation of the ring 15 in the loading direction, thereby moving the tape 2 while pushing the tape 2 toward the capstan 18 side.

First and second tape guide pins 20a and 20b are tiltably provided at the first rear position from the previous position disposed at a suitable interval with respect to the loading direction from the element 13 on the ring 16, and the second rear position is further rear than the first rear position. The pins 20a and 20b are, as shown in FIG. 4, contained tiltably in a guide pin container 21 formed under the rail 11, drawn from the container 21 upon rotating of the ring 15 in the loading direction, fed under the tape 2 pressed to the capstan 18 side, and kept erect by the tensions of springs 201, 202, as shown in FIGS. 5 and 6.

The guide pins 20a and 20b are introduced into the slots 12 of the rail 11 upon rotating of the ring 16, and moved in the slot 12 in the state that the upper end side of the pins are projected from the rail 11.

Reference numeral 23 designates a guide pin engaging plate having guide pin engaging portions 23a and 23b at both ends in such a manner that the first guide pin engaging portion 23a of loading direction side of the engaging portions 23a and 23b is disposed at the position lower than the other second guide pin engaging portion 23b.

On the other hand, the preceding guide pin 20a of the loading direction side of the pins 20a and 20b is formed shorter than the following guide pin 20b. This pin 20a is fed under the second guide pin engaging portion 23b, and engaged with the first engaging portion 23a when the element 12 arrives at the loading end position. The following pin 20b is engaged with the second engaging portion 23b when the element 13 arrives at the loading end position.

The heights of the rollers 14 and 15 on the element 13 are lower than both of the engaging portions 23a and 23b. Therefore, the element 13 is moved under the engaging portions 23a and 23b to the loading end position.

The tap 2 thus loaded is wound, as shown in FIG. 3, from the feeding side of the cassette 1 between the pinch roller 19 and the capstan 18 onto the outer periphery of the cylinder 10, separated from the cylinder 10, folded at the guide roller 14 of the front side of the element, guided by the roller 15 of the rear side of the element, and the pins 20a and 20b, and fed to the takeup side of the cassette 1.

Reference numerals 24 and 25 designate stationary guide pins or rollers, and reference numeral 25 denotes a control head.

The VTR records and reproduces while rotating the cylinder 10 in the reverse direction to the tape feeding direction as shown by an arrow in FIG. 3.

However, since the above-mentioned conventional tape loading device mounts the pins 20a and 20b guided in the state separated from the cylinder 10 at the folding side of the loaded tape 2 on the ring 15 to erect by the tensions of the springs 201 and 202 after passing under the tape 2 fed to the capstan 18 side the ring 16, the structure for mounting the ring 16 on the pins 20a and 20b is complicated. Further, in the loading device for erecting the pins 20a and 20b by the tensions of the springs 201 and 202, the pins 20a and 20b are tilted by the tension of the tape 2 at recording and reproducing time if the pins 20a and 20b are supported in the erected state by the tensions of the springs even after loading. Thus, it is necessary to provide the guide pin engaging plate 23 for engaging the pins 20a and 20b in the loading completed state as described above. Therefore, the conventional loading device has disadvantages that the structure is very complicated and troublesome in assembling.

Moreover, the guide rollers 14 and 15 provided on the element 13 are necessarily mounted adjustable in height on the guide roller mounts so as to accurately match the height of the rollers to the position of the tape.

FIG. 8 shows the mounting structure of the conventional guide rollers. Reference numeral 81 denotes a guide roller mounting portion (e.g., a rail laid along the drawing direction of the tape), and a roller shaft inserting hole 82 is formed at the mounting portion 81. The hole 82 restricts the attitude of a guide roller 83, and when the roller 83 is mounted vertically, the hole 82 is formed vertically.

Reference numeral 84 designates a roller shaft of the roller 83. A pair of upper and lower flanges 85a and 85b are secured to the upper end and to the intermediate portion of the roller shaft 84, and the roller 83 is interposed between the flanges 85a and 85b to be rotatably supported by the shaft 84.

Further, male threads 84a are formed on the lower portion of the lower flange 85b of the shaft 84, and female threads 82a to be engaged with the male threads 84a of the shaft 84 are formed on the upper end of the hole 82.

Reference numeral 86 depicts an elastic ring interposed between the lower surface of the lower flange 85b and the upper surface of the guide roller mounting portion 81. The shaft 84 is inserted into the hole 82 at the shaft of the lower side of the threads 84a. And the threads 84a is thrusted into the female threads 82a of the hole 82, thereby mounting on the mounting portion 81.

This guide roller mounting structure is provided to regulate the height of the roller 83 by turning the shaft 84 mounted on the mounting portion 81 by engaging the threads 84a with the threads 82a. When the shaft 84 is turned in the clamping direction, the shaft 84 is drawn to the ring 85 by the lower flange 85 while compressing the ring 86, whereas when the shaft 84 is turned in the reverse direction, the shaft 84 lifts the lower flange 85 by the elastic force of the ring 86. Thus, the interval H between the lower flange 85 of the shaft 84 and the mounting portion 81 is regulated to adjust the height of the roller 83.

Reference numeral 87 designates a clamping screw for clamping the lower end of the shaft 84, and the height-regulated roller 84 is securely fixed in height by securing the shaft 84 by clamping the screw 87.

When the roller is mounted adjustably in height, it is desirable to increase the engaging length between the roller shaft inserting hole of the guide roller mounting portion side and the roller shaft of the guide roller as long as possible so as to correctly hold the attitude of the roller.

However, since the clamp for drawing the roller shaft 84 to the guide roller mounting portion 81 is constructed to provide the male threads 84a at the roller shaft 84 and the female threads 82a to be engaged with the male threads 84a at the upper end of the roller shaft inserting hole 82 of the guide roller mounting portion 81 side in the above-mentioned conventional guide roller mounting structure, the length L1 of the effective portion for holding the attitude of the roller shaft 84 is shortened by the length L2 of the female threads 82a with respect to the inserting length L of the roller shaft 84 into the hole 82 (Since "a fluctuation" exists in the engaging portion between the male threads 84a and the female threads 82a, the engaging portion does not have the attitude holding action of the roller shaft 84.).

Thus, in the above-described conventional guide roller mounting structure, the angle of the roller shaft 84 with respect to the guide roller mounting portion 81 might slightly become misaligned. Thus, the conventional structure has a problem that the attitude accuracy of the guide roller 83 supported by the roller shaft 84 does not have reliability. If the length of the female threads 82a and the length of the male threads 84a are increased in the above-mentioned conventional guide, the length L1 of the effective portion for holding the attitude of the roller shaft 84 is increased and will more accurately hold the correct attitude of the roller shaft 84, but to this end the thickness of the guide roller mounting portion 81 must be increased. Thus, if the thickness of the guide roller mounting portion 81 is limited, it is impossible to increase the length L1 of the effective portion for holding the attitude of the roller shaft 84 by increasing the length of the female threads 82a and the length of the male threads 84a.

Accordingly, the conventional tape loading device has difficulties in the mounting structure of the tape guide roller which may cause the tape guide operation is to be disturbed.

SUMMARY OF THE INVENTION

It is, therefore, an object of the present invention to provide a new and improved tape loading device in which the structure is simple and can be readily assembled.

Another object of the present invention is to provide an improved tape loading device having a guide roller mounting structure capable of mounting a guide roller with a high attitude accuracy irrespective of the thickness of the guide roller mounting portion in which.

According to the present invention, there is provided a tape loading device in which a tape is drawn from a tape cassette and wound on a rotary head cylinder, said device comprising:

a guide rail member formed substantially in an arcuate shape along the outer periphery of said rotary head cylinder having a guide slot including a curved point raised at the outside in the intermediate region;

first and second movable members each having at least one engaging portion guided to the guide slot of said guide rail member and movably supported at two front and rear positions in the guide slot of said guide rail member;

first and second tape guide members stood corresponding to said first and second movable members and introduced into the inside of the exposed tape of said tape cassette at the mounting time of said tape cassette;

first drive mechanism coupled by said first movable member for transmitting a drive power for moving the first movable member from the initial loading position opposed to the mounting position of said tape cassette in the center of said guide slot to the end of said guide slot to become the loading finishing position; and a second drive mechanism coupled with said second movable member for transmitting drive power for moving the second movable member from the initial loading position opposed to the mounting position of said tape cassette in the guide slot to the intermediate portion of said guide slot to become the loading finishing position.

BRIEF DESCRIPTION OF THE DRAWINGS

These and other objects and features of the present invention can be understood by reference to the accompanying drawings, in which:

FIG. 16 is a plan view of the lower loading ring of FIG. 9;

FIG. 17 is a plan view of the upper loading ring of FIG. 9;

FIG. 26 is a longitudinal sectional view of the guide roller mounting structure adapted for the same embodiment.

DETAILED DESCRIPTION OF THE PREFERRED EMBODIMENTS

The present invention will now be described in more detail with reference to the accompanying drawings.

Figure 1:
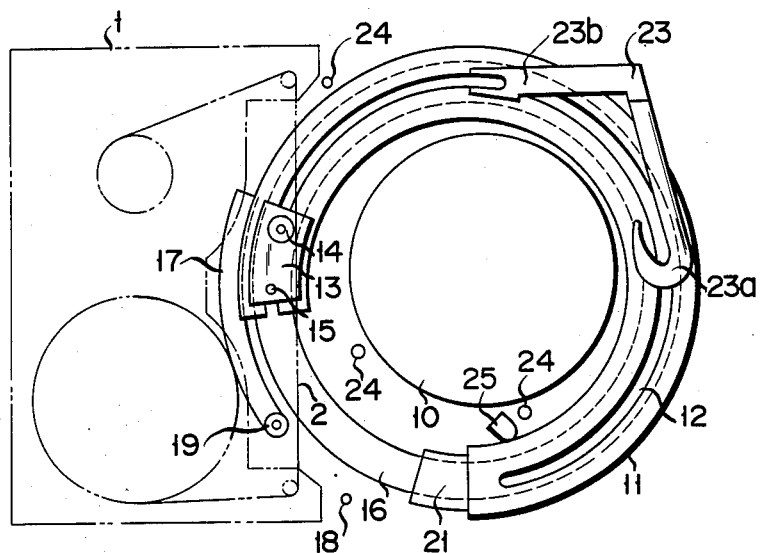
FIG. 1 is a plan view of the state before loading a conventional loading device.
Figure 2:
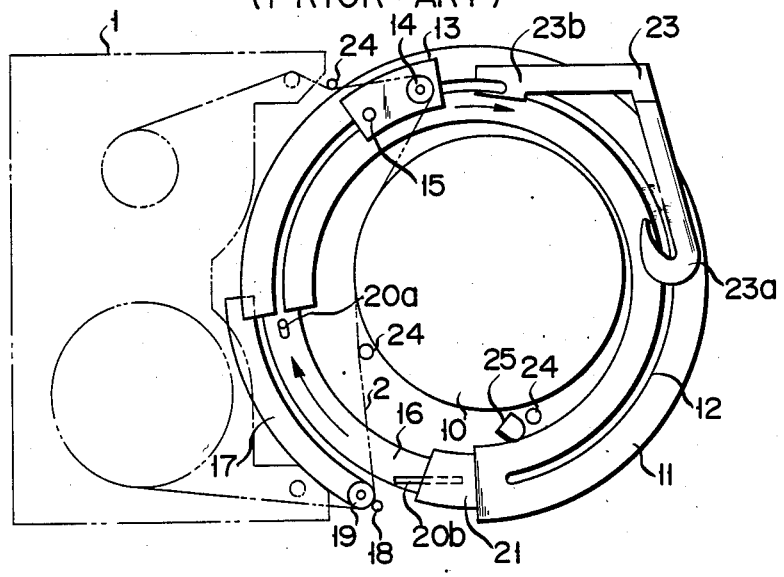
FIGS. 2 and 3 are plan views of the state in the midway of loading and the loading completed state.
Figure 3:
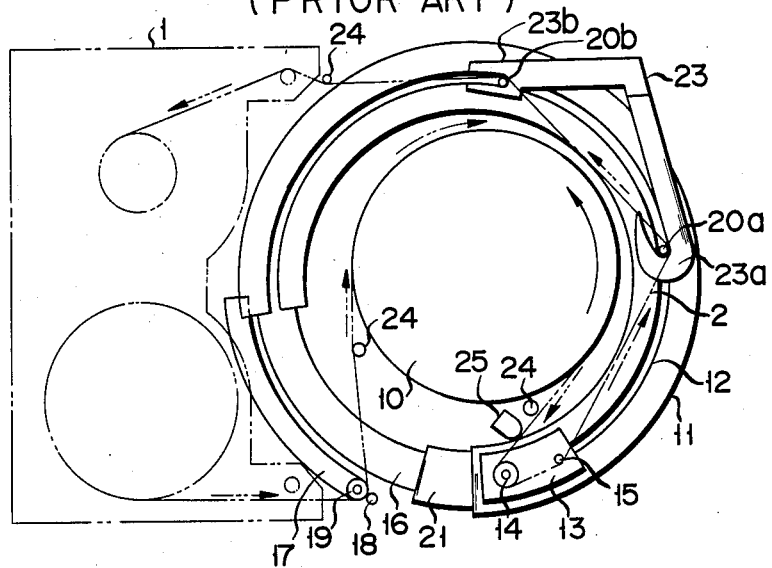
Figure 4:
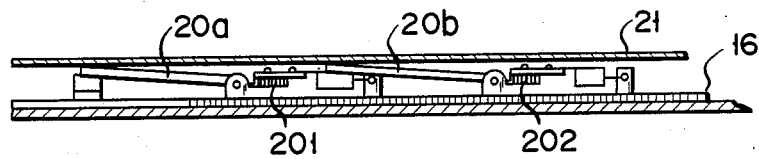
FIG. 4 is a developed front view similarly of the loading device in the unloaded state.
Figure 5:
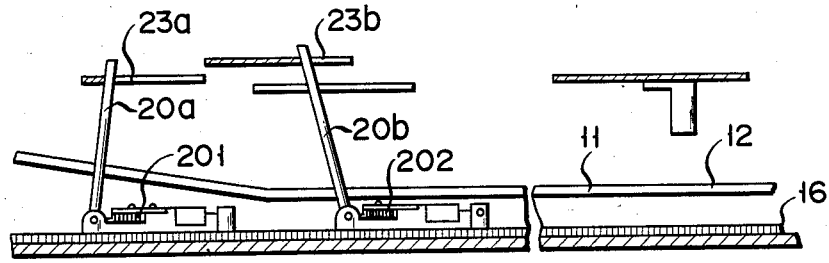
FIG. 5 is a developed front view of the loading device similarly in the loading completed state.
Figure 6:
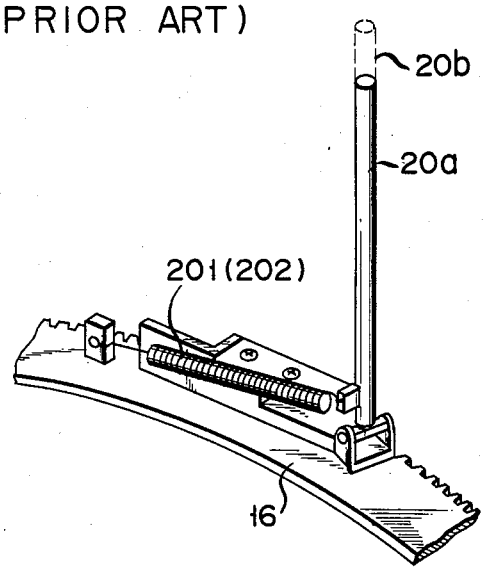
FIG. 6 is a perspective view of a tape guide pin supported onto the loading ring of FIG. 1.
Figure 7:
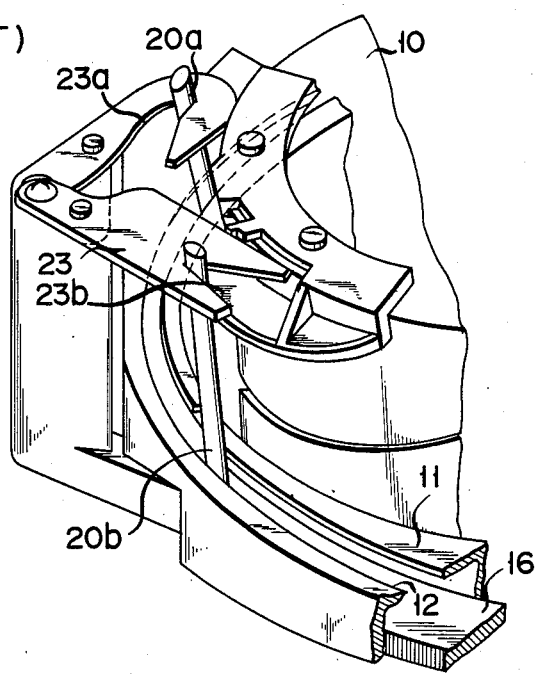
FIG. 7 is a perspective view of a tape guide pin similarly at the final loading position.
Figure 8:
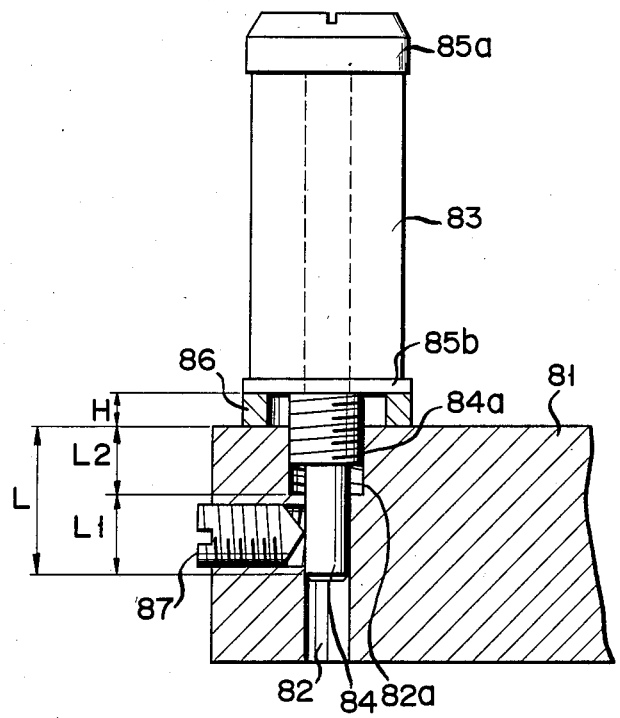
FIG. 8 is a longitudinal sectional view of a guide roller mounting structure adapted for the conventional loading device.
Figure 9:
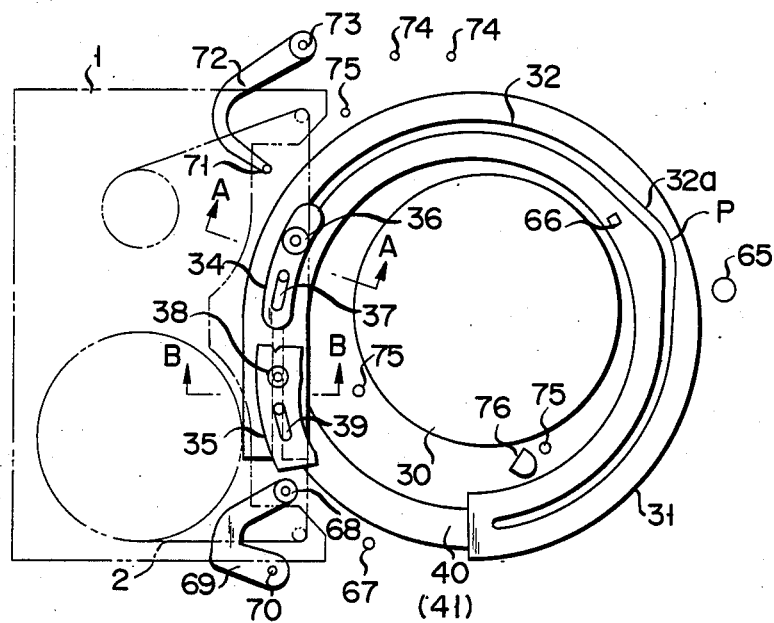
FIG. 9 is a plan view of an embodiment of the state of a tape loading device according to the present invention before loading.
Figure 10:
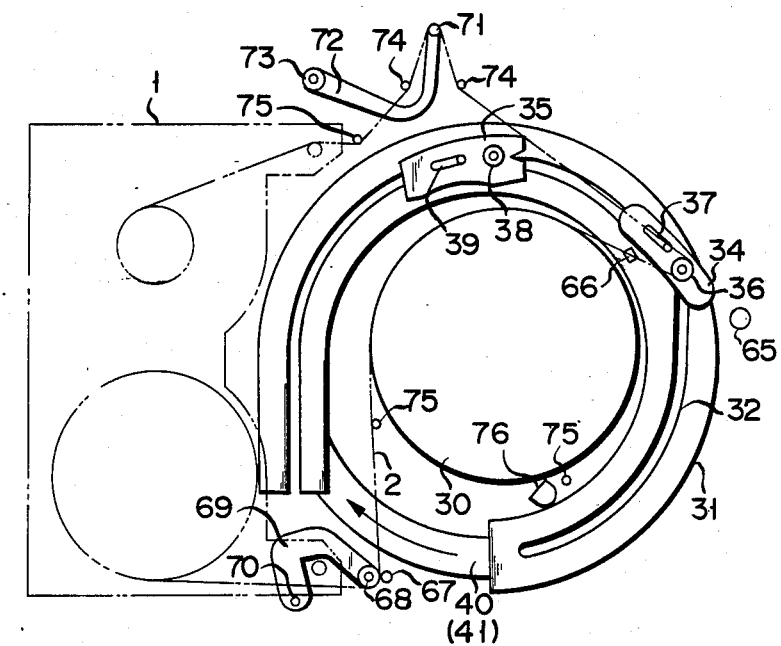
FIGS. 10 and 11 are plan views of the state in the midway of loading and the loading completed state.
Figure 11:
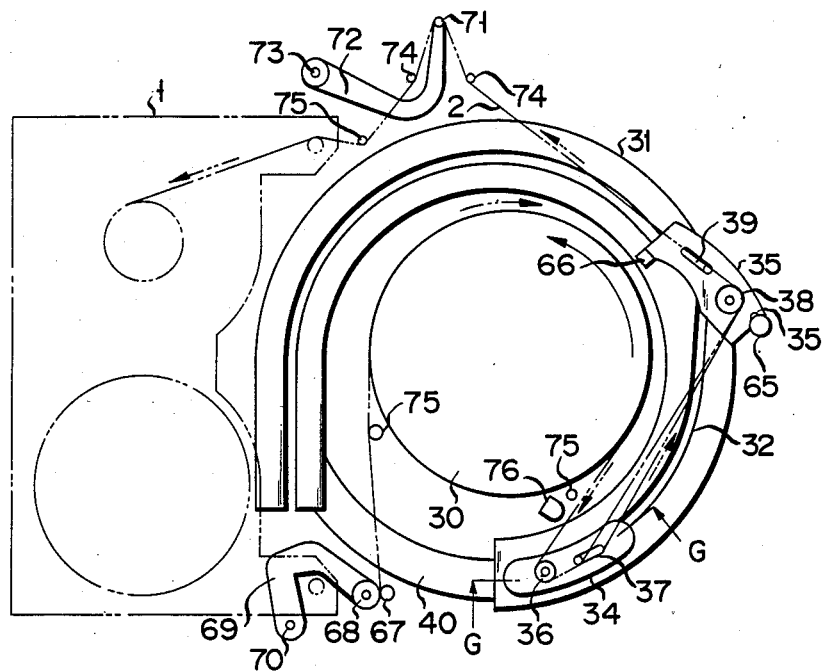

FIGS. 9 to 11 are plan views of a tape loading device, FIG. 9 is the initial state before loading; FIG. 10 is the intermediate state of loading; and FIG. 11 is the loading completed state.

Figure 21:
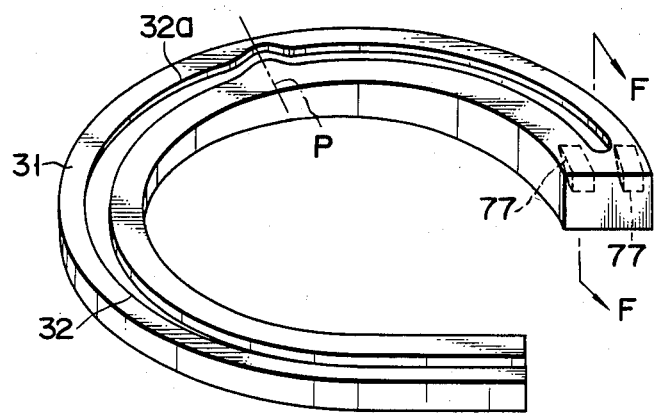
FIG. 21 is a perspective view of the guide rail.

In FIGS. 9 to 12, reference numeral 30 designates a rotary head cylinder, and reference numeral 31 denotes a guide rail which surrounds the outer periphery of the cylinder 30. This rail 31 has a linear portion formed at the starting end side corresponding to a tape cassette mounting portion, and a curved portion which surrounds the outer periphery of the cylinder 30 and is formed at all portions except the linear portion. As shown in FIG. 21, the upper surface of the rail 31 is formed with a flat surface of the same height from the linear portion to the substantially intermediate point P of the curved portion and gradually ascending slope surface raised toward the end side from the intermediate point P to the end side.

A movable element guide slot 32 is formed substantially over the entire length on the upper surface of the rail 31. The slot 32 is varied in curvature from the intermediate point P of the curved portion of the rail 31 as a boundary, and is formed with an extended portion 32a extending obliquely to the outer peripheral side of the rail 31 toward the end side of the rail 31 and hence the loading end side before the boundary.

Reference numerals 34 and 35 designate front and rear movable elements supported by the rail 31 to move on the rail 31. As shown in FIG. 9, the elements 34 and 35 are disposed at the initial positions opposite to the mounting position of the tape cassette 1 in the state before loading.

Figure 12:
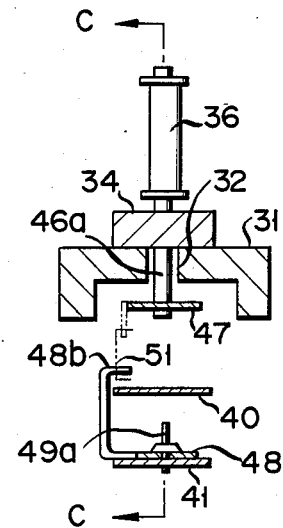
FIGS. 12 and 13 are enlarged sectional views taken along the lines A—A and B—B of FIG. 9.
Figure 13:
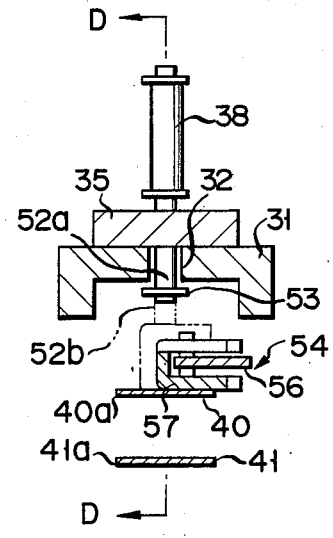
Figure 14:
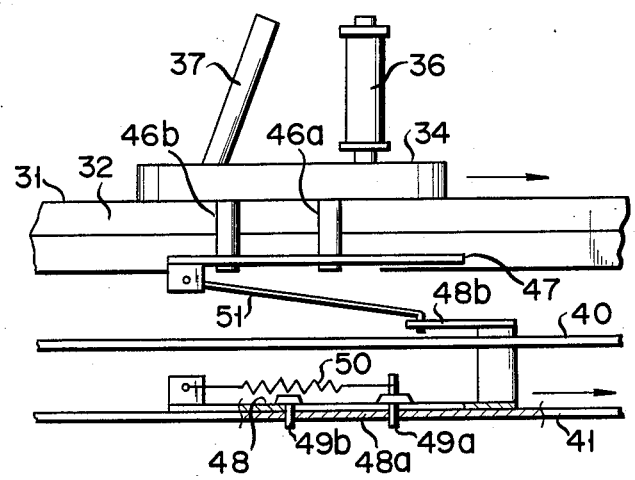
FIG. 14 is a sectional view taken along the line C—C of FIG. 12.
Figure 15:
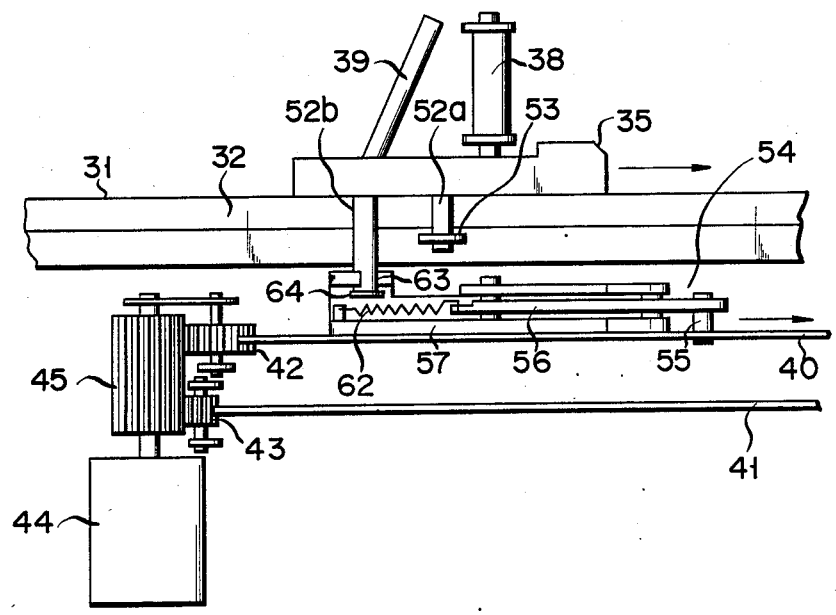
FIG. 15 is a sectional view taken along the line D—D of FIG. 13.

As shown in FIGS. 12 and 14, a tape guide roller 36 and a tape guide pin 37 are stood at the front and rear positions on the upper surface of the front side element (hereinafter referred to as "a preceding element") 34 directed toward the loading direction of the two elements 34 and 35. Similarly, a tape guide roller 38 and a tape guide pin 39 are stood, as shown in FIGS. 13 and 15, at the front and rear positions on the upper surface of the rear side element (hereinafter referred to as "a following element") 35. The pins 37 and 39 are all respectively inclined obliquely with respect to the rollers 37 and 39 side in the longitudinal direction.

On the other hand, as shown in FIGS. 12 and 15, upper and lower loading rings 40 and 41 are disposed under the rail 31. The rings 40 and 41 are formed in a circular shape as shown in FIGS. 17 and 16 and formed with teeth 40a and 41a, respectively, over the entire peripheries thereof.

The rings 40 and 41 are respectively driven by drive gears 42 and 43 engaged in mesh with the teeth 40a and 41a, respectively, of the outer peripheries thereof, and rotated under the guidance of a ring guide, not shown. The gears 42 and 43 are engaged in mesh with a gear 45 mounted in a motor 44 as shown in FIG. 15 and driven by the motor 44. Therefore, the rings 40 and 41 are rotatably driven by this one motor 44. The gear 43 for driving the ring 41 is formed in a diameter smaller than the gear 42 for driving the ring 40. Thus, the ring 41 is rotated at a speed faster than the ring 40.

The preceding element 34 is coupled partly with the ring 41 of the upper and lower rings 40 and 41 to move on the rail 31 by the rotation of the ring 41. Similarly, the following element 34 is coupled partly with the ring 40 to move on the rail 31 by the rotation of the ring 40.

The preceding element 34 is coupled with the lower ring 41 as the following describes how. In FIGS. 12 and 14, reference numerals 46a and 46b designate front and rear guide shafts projected at the front and rear end sides on the lower surface of the preceding element 34. The shafts 46a and 46b move in the guide slot 32 of the rail 31 to move the element 34 along the slot 32. The shafts 46a and 46b are projected through the slot 32 of the rail 31 toward the lower side of the rail 31. A laterally long leaf spring 47 is mounted on the lower ends of the shafts 46a and 46b.

In FIGS. 14 and 16, reference numeral 48 designates a slide plate provided on part of the upper surface of the lower ring 41. The slide plate 48 has a long hole 48a formed along the circumferential direction of the ring 41, and is supported movably in the circumferential direction to the ring 41 by two pins 49a and 49b inserted into the holes 48a of the plate 48. The slide plate 48 is pulled in the rotating direction of the ring 41 by a coil spring 50 for coupling the pin 49a disposed at the rotating direction side of the ring (in the rotating direction at the loading time) of the pins 49a and 49b with the rear end (with respect to the rotating direction of the ring) of the slide plate 48.

A preceding element pulling piece 48b extending on the ring 40 around the outside of the ring 40 is formed as shown in FIG. 12 at the end of the slide plate 48. The preceding element 34 is coupled through the slide plate 48 with the lower ring 41 by coupling the rear end of the spring 47 with the pulling piece 48b by a wire 51 as shown in FIG. 14. Both ends of the wire 51 are coupled rotatably with respect to the leaf spring 47 and the pulling piece 48b.

More particularly, the preceding element 34 is pulled by the wire 51 by the rotation of the lower ring 41 to move on the rail 31 in the loading direction.

In this case, when the preceding element 34 arrives at the ascending slope portion of the rail 31, the element 34 rises along the ascending slope of the rail 31 upon moving toward the loading direction. Thus, the wire 41 is laid at a small angle as shown in FIG. 14 when the element 34 is disposed at the initial position opposed to the tape cassette mounting position, but as the element 34 rises, it is gradually positioned in an erect manner. Therefore, as the element 34 rises, unreasonable force is not applied to the element 34, the lower ring 41 or the coupled portion thereof.

When the element 34 is moved, a large resistance might be temporarily applied to the element 34 by the variation in the sliding resistance of the element 34 on the rail 31. Thus, a large resistance is also applied to the slide plate 48 at the lower ring 40 side. However, at this time, the spring 50 for pulling the slide plate 48 backward is temporarily elongated to allow the displacement of the slide plate 48 with respect to the lower ring 41. Therefore, even in this case, unreasonable force is not applied to the element 34, the lower ring 41 or the coupled portion thereof.

Then, the coupling structure of the following element 35 with the upper loading ring 40 will be described. In FIGS. 13 and 15, reference numerals 52a and 52b designate front and rear guide shafts projected from the lower surface of the following element 35. The shaft 52a of front side of them is provided longitudinally at the center of the following element 35, and the shaft 52b is provided at the rear end of the following element 35. The shafts 52a and 52b are engaged within the guide slot 32 of the rail 31 to move along the slot 32 of the element 35. The front side guide shaft 52a is provided to merely guide the movement of the following element 35. A stopper ring 53 for preventing the following element 35 from falling of the rail 31 is provided on the lower end of the shaft 52a opposite to the lower surface of the rail 31. The ring 53 is provided at a slight interval with respect to the lower surface of the rail 32 so as to absorb the upward and downward vibrations of the element 35. On the other hand, the guide shaft 52b at the rear side of the element 35 operates as a coupling shaft of the following element 35 with the upper ring 40. Thus, the rear guide shaft 52b is projected downward from the front guide shaft 52a.

In FIGS. 15 and 17, reference numeral 54 designates a following element coupling joiner provided on part of the upper surface of the upper loading ring 40. The rear guide shaft 52b of the following element 35 is coupled with the joiner 54.

Figure 18:
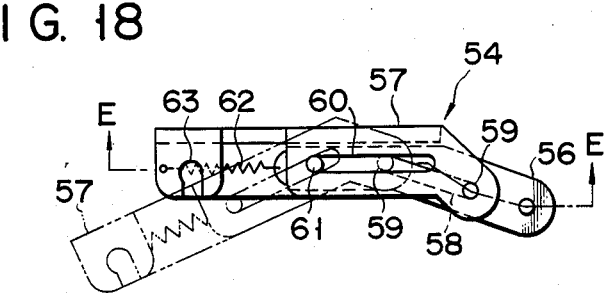
FIG. 18 is a plan view of a joiner for coupling a movable element with the upper loading ring in FIG. 9.
Figure 19:
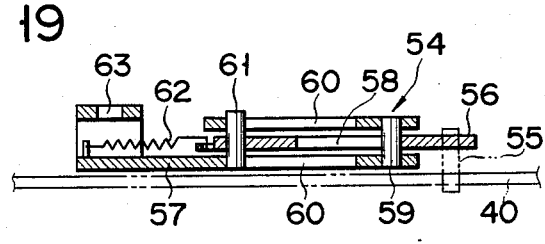
FIG. 19 is a sectional view taken along the line E—E of FIG. 18.

FIGS. 18 and 19 show the construction of the joiner 54. The joiner 54 is telescopically formed of a rotary arm 56 provided rotatably on the upper ring 40 to be pivotally secured at the base end to a supporting shaft 55 which is fixed to the upper ring 40, and a slide arm 57 slidably supported by the arm 56. The arm 57 is formed in U shape of cross section to interpose the arm 56 between the both legs of the arm 57. A pin 57 which is slidably engaged within a long hole 58 formed on the arm 56 is provided at the base end of the arm 57. A pin 61 is formed at the end of the arm 56 to slidably engage with long holes 60 formed at the upper and lower surfaces of the arm 57.

Reference numeral &2 designates a tensile spring (coiled spring) for coupling the end of the arm 56 with the end of the arm 57. The joiner 54 is always held in a compressed state by the tensile force of the spring 62.

The base end sides of the arms 56 and 57 are respectively bent to one sides of the joiner 54 (forked open side of the slide arm 57. The long hole 58 of the arm 56 is inclined substantially at the same angle as the bending angle of the base end of the arm 56. The long hole 60 of the arm 57 is formed to cross the long hole 58 of the arm 56 at a small angle along the longitudinal direction of the arm 57.

The joiner 54 is elongated against the tensile force of the spring 62 when the tensile force for moving the arm 57 to the end side is applied to the arm 57. In other words, the arm 57 is moved in an arcuate locus under the guidance of the pins 59 and 61 via the long holes 58 and 60, as shown by the dotted line in FIG. 18.

The joiner 54 is pivotally secured, as shown in FIGS. 15 and 17, at the base end of the arm 56 to the shaft 55 provided at the upper ring 40 to direct the forked open side of the arm 57 toward the inner peripheral side of the ring 40 and to direct the base end of the arm 56 toward the rotating direction (the rotating direction at the loading time) of the upper ring 40, and mounted on the upper ring 40 in the state that the end of the arm 57 is directed to the rear side with respect to the rotating direction of the upper ring 40.

A following element coupling hole 63 is formed at the upper end of the arm 57. The guide shaft 52b at the rear side of the following element 35 is coupled with the hole 63 of the arm 57. In FIG. 15, reference numeral 64 designates a stopper ring provided at the lower end of the guide shaft 52b. The ring 64 is also disposed at a slight interval with respect to the following element coupling hole forming surface of the arm 57 so as to absorb the upward and downward vibrations of the following element 45.

More specifically, the following element 35 pulls the guide shaft 52b of rear side by the joiner 54 by the rotation of the upper ring 40, to move on the rail 31 in the loading direction.

Figure 20:
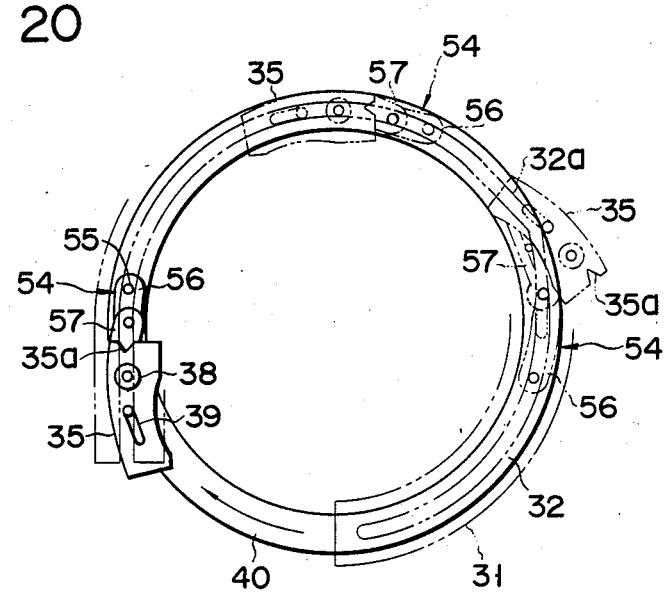
FIG. 20 is a plan view showing the moved state of the rear movable element of FIG. 9.

FIG. 20 shows the moving state of the following element 35 moved in the loading direction by the rotation of the upper loading ring 40.

The following element 35 is moved to the end of the flat surface of the rail 31 to stop at the position immediately before the ascent slope surface as will be described in detail. Therefore, it is not necessary to couple the following element 35 with the joiner 54 as to allow the following element 35 to rise similarly to the preceding element 34. Further, when the following element 35 is moved, a large resistance might be temporarily applied to the following element 34 due to the variation in the slide resistance to the surface of the rail 31. However, in this case, since the joiner 54 is elongated against the tensile force of the spring 62, unreasonable force is not applied to the following element 35, the upper ring 40 or the joiner 54.

Figure 22:
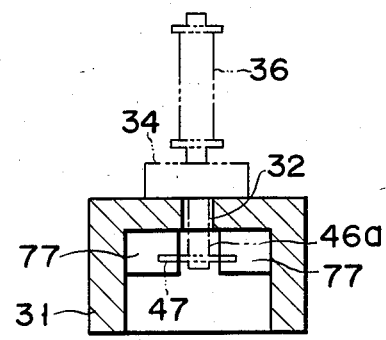
FIG. 22 is an enlarged sectional view taken along the line F—F of FIG. 21.

On the other hand, as shown in FIGS. 21 and 22, a leaf spring riding portion 77 inclined obliquely downward toward the loading direction is provided at both ends of the guide slot 32 on the lower surface of the rail 31. The spring 47 under the preceding element 34 is provided in height corresponding to the rising portion 77.

In FIGS. 9 to 11, reference numeral 65 designates a following element stopper for stopping the end of the following element 35 extending to the outer peripheral side of the guide rail along the extended portion 32a of the guide slot 32 when moved to the intermediate point P of the curved portion of the rail 31. Reference numeral 66 denotes a rotation stopping projection for restricting the extending attitude of the following element 35 to the outer peripheral side of the guide rail 31. The stopper 65 is provided at the outer peripheral side of the rail 31. The projection 66 is projected on the upper surface of the inner peripheral edge of the rail 31.

In FIGS. 9 to 11, reference numeral 67 designates a capstan, and reference numeral 68 denotes a pinch roller for pressing the tape 2 to the capstan 67. The roller 68 is provided at the end of the arm 69. The arm 69 is rotated by a rotating mechanism, not shown, pivotally secured at the base end by a supporting shaft 70. The roller 68 is disposed at the inside position of the exposed tape of the tape cassette 1 before loading as shown in FIG. 9, and moved to the capstan 67 side by the rotation of the arm 69 after the loading is started.

Further, in FIGS. 9 to 11, reference numeral 71 designates a tension pin for applying tension to the loaded tape 2. The pin 71 is provided at the end of a tension regulator arm 72. The arm 72 applies a tension to the tap pressed by the tension of the tension pin. This arm 72 is pivotally secured by a supporting shaft 73 and rotated by a rotating mechanism, not shown. The pin 71 is disposed at the inside position of the exposed tape of the cassette 1 before loading as shown in FIG. 9, and moved to project outside between a pair of tape guide pins 74 and 74 by the rotation of the arm 72 after the loading is started as shown in FIGS. 10 and 11.

In FIGS. 9 to 11, reference numeral 75 denotes the other tape guide pin or guide roller, and reference numeral 76 denotes a control head.

The loading operation of the tape loading device constructed as described above will be described. Preceding element 34 and following element 35 are disposed at the initial position opposite to the tape cassette mounting position in the state before loading as shown in FIG. 9. When the cassette 1 is mounted in this state, the guide roller 36, the guide pin 37 on the preceding element 35 the guide roller 38, the guide pin 39 on the following element 35, the pinch roller 58, the tension pin 71 are introduced inside the exposed portion of the cassette 1.

When the loading ring drive motor 44 is driven in this state, the upper and lower loading rings 40 and 41 are rotated in the loading direction. Thus, the preceding and following elements 34 and 35 move in the loading direction on the rail 31. The element 34 is preceded while gradually separating from the following element 35 since the lower rail 31 for moving the preceding element 34 is rotated at a speed faster than the upper ring 40. In this process, the roller 36 before the preceding element draws the tape 2 from the cassette 1 and winds the tape 2 on the outer periphery of the rotary head cylinder 30 as shown in FIG. 10.

The pinch roller 68 is moved to the capstan 67 side simultaneously when starting loading to press the tape 2 on the capstan 67. The pin 71 is also moved to project at the outside between the pins 74 and 74 to become the state for applying tension to the tap 2.

Then, the preceding element 34 is moved in the loading direction on the rail 31 while guiding the shafts 46a and 46b on the lower surface of the preceding element 34 via the guide slot 32 of the rail 31, and eventually moved to the end of the rail 31. The preceding element 34 is formed in width and length for passing between the stopper 65 and the projection 66 without contact with the stopper 65 and the projection 66 even when varying the attitude obliquely along the extended portion 32a of the slot 32. Therefore, the preceding element 34 is moved over the extended portion 32a of the slot 32 to the end of the rail 31.

Figure 23:
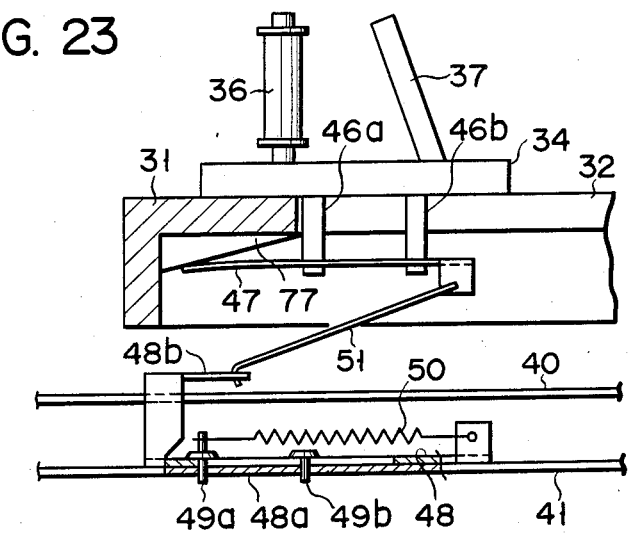
FIG. 23 is an enlarged sectional view taken along the line G—G of FIG. 11.

When the preceding element 34 approaches the end of the rail 31, the end of the leaf spring 47 under the element 34 contacts the oblique surface of the riding portion 77. Thus, the spring 47 rises on the riding portion 77 while elastically deforming as shown in FIG. 23, then maintains the element 34 in close contact with the surface of the rail 31 without fluctuation. In this case, when the end of the spring 47 contacts the oblique surface of the riding portion 77, the moving resistance of the element 34 increases, and the spring 50 for pulling the slide plate 48 of the ring 41 is elongated so that the slide plate 48 and the element 34 are almost stopped. However, when the ring 41 is further rotated so that the pin 49a contacts the end of the long hole 48a of the plate 48, the plate 48 is forcibly moved by the lower ring 41. Thus, the element 34 is moved until the shaft 46a contacts the end of the slot 32 to becomes the state wherein the spring 47 rides on the riding portion 77.

Figure 24:
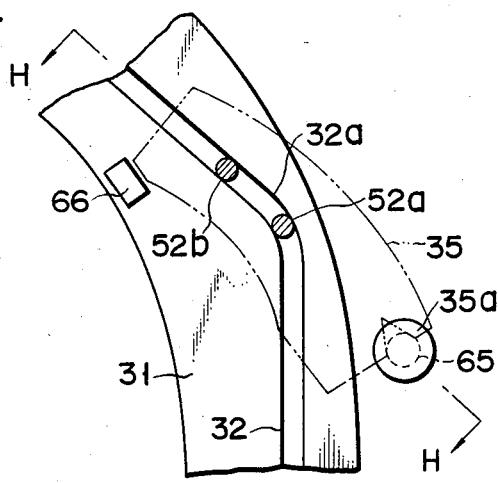
FIG. 24 is a plan view showing the attitude of the rear movable element of this embodiment when the loading is completed.
Figure 25:
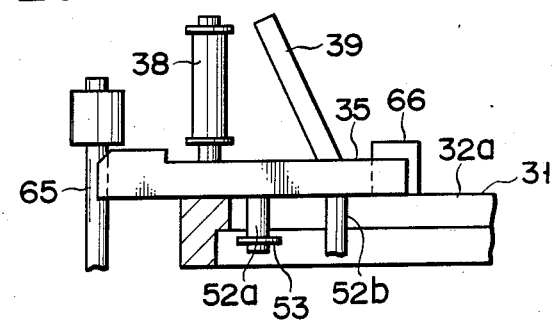
FIG. 25 is a sectional view taken along the line H—H of FIG. 24.

On the other hand, the moving speed difference between the preceding element 34 and the following element 35 (the rotating speed difference between the upper and lower loading rings 40 and 41) is set such that the following element 35 arrives at the extended portion 32a of the slot 32 immediately before the preceding element 34 reaches the end of the slot 32. After arriving at the extended portion 32a of the slot 32, the following element 35 alters its direction along the extended portion 32a to attain the attitude such that the front end side is extended to the outer peripheral side of the rail 31 as shown in FIGS. 24 and 25. In the embodiment described above, the guide shafts 52a and 52b on the lower surface of the following element 35 are provided at the longitudinal center and the rear end side of the following element 35. Therefore, when the front side shaft 52a is moved to the top of the extended portion 32a of the slot 32, the front side of the following element 35 can be largely extended to the outer peripheral side of the rail 31.

When the front end side of the following element 35 is extended to the outer peripheral side of the rail 31, the rear end side of the element 35 contacts the projection 66. Thus, the element 35 is restricted in its attitude by the projection 66, and when the guide shaft 52a is extended until arriving at the top of the extended portion 32a of the slot 32, the V-shaped notch 35a formed at the end of the following element 35 is engaged with the stopper 65. When the element 35 is stopped by the stopper 65 in this manner, the joiner 54 is then elongated against the tensile force of the spring 62 upon rotating of the upper ring 40. The element 35 is pressed on the stopper 65 by the tensile force of the spring 62 and stopped. The stopping timing of the element 35 coincides with that for fixing the element 34 by riding the spring 47 of the element 34 on the riding portion 77. Accordingly, the preceding and following elements 34 and 35 are simultaneously stopped.

The motor 44 moves the elements 34 and 35 to the moving limit and is simultaneously stopped by the operation of a switch (not shown) for detecting the movement of the element 34 to the moving limit. When this motor 44 is stopped, the upper and lower rings 40 and 41 are locked at the positions by the motor 44 as a brake.

The tape 2 thus loaded is wound on the outer periphery of the cylinder 40 between the pinch roller 68 and the capstan 67 from the feeding side of the cassette 1 as shown in FIG. 11, separated from the cylinder 40, folded by the guide roller 36 at the front side of the preceding element 34 and introduced into the takeup side of the cassette 1 through the pin 71 under the guidance of the pin 37 at the rear side of the preceding element 34, the guide roller 34 of the following element 35 and the guide pin 39.

Recording and reproducing of the tape 2 are performed while rotating the cylinder 30 in the reverse direction to the tape feeding direction as shown by an arrow in FIG. 11.

After the recording and the reproducing, the motor 44 is reversely rotated while rewinding the tape 2 to rotate reversely the upper and lower rings 40 and 41 to the loading direction to reset the following and preceding elements 35 and 34 to the initial positions, and the pinch roller 68 and the tension pin 71 are returned to their initial positions, and the cassette 1 is then removed.

More particularly, as described above, this tape loading device supports the two front and rear movable elements and hence the preceding element 34 and the following element 35 opposite to the tape cassette mounting position on the rail 31 surrounding the outer periphery of the rotary head cylinder 30. Further, the tape guide members (the guide roller and the guide pin) 36, 37 and 38, 39 introduced into the inside of the exposed portion of the cassette 1 when the cassette 1 is mounted at the mounting position are provided at the preceding and following elements 34 and 35. Moreover, the lower loading ring 41 coupled with the front preceding element 34 for moving the preceding element 35 from its initial position opposite to the tape cassette mounting position to the loading finished position of the tape 2, and the upper loading ring 40 coupled with the rear following element 35 for moving the following element 35 from the initial position opposite to the tape cassette mounting position to the position before the loading end are provided at the upper and lower positions under the guide rail 31. In addition, the tape loading device has the tape guide members 36, 37 for pulling the tape 2 from the cassette 1 and winding the tape 2 on the rotary head cylinder 30, and the tape guide members 38, 39 for guiding the folded side of the loaded tape 2 in the state separated from the rotary head cylinder 30 on the front and rear elements 34 and 35 moving on the rail 31. In this case, the two elements 34 and 35 are provided to introduce the tape guide members of both the elements 34 and 35 to the inside of the exposed tape of the cassette 1 mounted in the state disposed at the initial position opposite to the cassette mounting position. Therefore, it is not necessary in this tape loading device to erect the tape guide pin to the loading ring by the tension of the spring like the conventional tape loading device. Since it is not necessary as well in this tape loading device to provide means for engaging the tape guide pin erected by the tension of the spring in the loading completed state, the structure can be simplified, and the assembling can be facilitated.

In the embodiment described above, the preceding element 34 is moved by the lower loading ring 41, and the following element 35 is moved by the upper loading ring 40. However, in another manner, the preceding element 34 may be moved by the upper loading ring 40, and the following element 35 may be moved by the lower loading ring 41. Further, the drive mechanism for the loading rings 40 and 41 or the coupling structure of the loading rings and the movable elements need not be limited to the above-mentioned embodiment.

A guide roller mounting structure adapted for the guide rollers 36, 38 will be now described.

In FIG. 26, reference numeral 111 designates a guide roller mounting portion. The mounting portion 111 has a roller shaft inserting hole 112 and a threaded hole 113 formed in parallel with one another. The inserting hole 112 is provided to restrict the attitude of a guide roller 114. In other words, when the roller 114 is mounted vertically, the inserting hole 112 and the hole 113 are formed perpendicularly.

Reference numeral 115 designates a roller shaft of the roller 114. The shaft 115 has a pair of upper and lower flanges 116a and 116b secured to the upper end and the intermediate portion of the shaft 115. The roller 114 is interposed between the upper flange 116a and the lower flange 116b to be rotatably supported by the shaft 115. The lower portion of the flange 116b of the shaft 115 has a diameter which snugly engages with the hole 112 of the mounting portion 111. This portion is slidably inserted into the hole 112.

An arm member 117 extending sidewise from the shaft 115 is press-fitted at the base end to the shaft 115 under the lower flange 116. A roller height regulating screw 118 to be engaged with the threaded hole 113 of the mounting portion 111 is inserted into the end of the member 117. The screw 118 clamps the member 117 to the mounting portion 111. This screw 118 is inserted into a long hole 119 formed along the longitudinal direction at the end of the member 117.

Reference numeral 120 denotes a coil spring interposed between the lower surface of the end of the member 117 and the upper surface of the mounting portion 111. This spring 120 is movably engaged with the screw 118.

This spring 120 supports the member 117 by the tension of the spring. The arm member 117 is pressed upward by the tension of the spring 120 and supported to the head 118a of the screw 118.

Reference numeral 121 designates a clamping screw for clamping the shaft 115 to the inserting hole 112.

This guide roller mounting structure is provided to regulate the height of the roller shaft 115 and hence the height of the guide roller 114 through the arm member 117 by regulating the height of the arm member 117 by the screw 118. In other words, when the screw 118 is turned in a clamping direction, the arm member 117 is pressed to the mounting portion side while compressing the spring 120 by the clamping force of the screw 118. When the screw 118 is reversely turned, the arm 117 is raised by the tension of the spring 120. When an interval H between the member 117 and the mounting portion 111 is regulated in this manner, the height of the guide roller 114 can be regulated.

In the guide roller mounting structure, as described above, the screw 118 is provided separately from the roller shaft 115, hence it is not necessary to provide threaded portions at both the roller shaft and the roller shaft inserting hole. Therefore, according to the guide roller mounting structure, the attitude of the roller shaft 115 can be held by the entire length L of the roller shaft 115 which is inserted into the inserting hole 112. Thus, even if the thickness of the mounting portion 111 is not increased, the attitude holding length of the shaft 115 will be sufficient. Therefore, the guide roller 114 may be mounted with high attitude accuracy irrespective of the thickness of the mounting portion 111. Thus, the tape guiding operation may be preferably maintained.

In the embodiment described above, the coil spring 120 for supporting the arm member 117 is movably engaged with the screw 118. The present invention is not limited to the particular embodiment. For example, the spring 120 may be provided at the other position. In this case, the tension of the coil spring 120 operates as the moment for rotating the arm member 117 with the screw 118 as a center. However, since the roller shaft 115 is held in the inserting hole 112 in sufficient engaging length, the shaft 115 may not be inclined by the moment. However, since it is not desirable that the above moment so act, it is desirable to provide the coil spring 120 at the clamping portion of the roller height regulating screw 118. In the embodiment described here, the coil spring 120 is used as the elastic member for supporting the arm member 117. However, this elastic member may be, for example, rubber.

Further, in the embodiment described above, the guide roller 114 is mounted vertically on the guide roller mounting portion 111. However, the present invention is not limited to these particular embodiments. For example, the present invention may be applied to the case that the guide roller may be mounted obliquely or laterally with respect to the guide roller mounting portion.

What is claimed is:

1. A tape loading device in which a tape is drawn from a tape cassette and wound on a rotary head cylinder, said device comprising:
a guide rail member formed substantially in an arcuate shape along an outer periphery of said rotary head cylinder and having a guide slot, said guide slot extending substantially along the entire length of said guide rail member and having an intermediate portion between a mounting-position end and a loading-finished end, said intermediate portion of the guide slot having an extended portion positioned obliquely outwardly relative to an outer edge of said arcuate guide rail member;
first and second movable members each having at least one engaging portion guided to the guide slot of said guide rail member and movably supported at, respectively, front and rear positions relative to each other in the guide slot of said guide rail member to move from respective initial positions to respective loading-finished positions;
first and second tape guide members aligned correspondingly to said first and second movable members and introduced into the inside of the exposed tape of said tape cassette when said tape cassette is mounted into the tape loading device;
first drive mechanism coupled by said first movable member for transmitting a drive power for moving the first movable member from its initial loading position opposed to a mounting position of said tape cassette to said loading-finished end of said guide slot to reach its loading-finished position; and
a second drive mechanism coupled with said second movable member for transmitting drive power for moving the second movable member from its initial loading position at the mounting-position end of the guide slot opposite to the mounting position of said tape cassette to the intermediate portion of said guide slot to reach its loading-finished position.

2. The tape loading device according to claim 1, wherein the guide slot formed in said guide rail member is formed rectilinearly at the starting end opposite to the mounting position of said tape cassette.

3. The tape loading device according to claim 2, wherein said guide rail member is formed with a flat surface from the rectilinearly starting end of said guide slot in the vicinity of the intermediate portion, and with an ascending slope surface from the vicinity of the intermediate portion of said guide slot to said end.

4. The tape loading device according to claim 1, said device further comprising: a first stopper mechanism for securing said second movable member at the intermediate portion of said guide slot.

5. The tape loading device according to claim 4, wherein said first stopper mechanism comprises a projected first stopper member provided at an inner peripheral side of said guide slot at a rear portion of the intermediate portion of said guide slot in said guide member, and a second stopper member provided at an outer peripheral side of said guide slot at a front portion of the intermediate portion of said guide slot, said first stopper member is engaged with a rear end of said second movable member, and said second stopper member is engaged with a front end of said second movable member.

6. The tape loading device according to claim 1, said device further comprising: a second stopper mechanism for securing said first movable member at the loading-finished end of said guide slot.

7. The tape loading device according to claim 6, wherein said second stopper mechanism comprises a leaf spring coupled with said first movable member, and an oblique leaf spring riding member provided connectible with said leaf spring at an end of said guide slot.

8. The tape loading device according to claim 1, wherein said first and second tape guide members respectively comprise tape guide rollers and tape guide pins provided at the front and rear of said first and second movable members.

9. The tape loading device according to claim 8, wherein said tape guide pins are respectively inclined toward said corresponding tape guide rollers.

10. The tape loading device according to claim 8, wherein a roller shaft inserting hole and a threaded hole are formed in parallel with one another, at least one of said first and second movable members to become said guide roller mounting portion, a roller shaft for rotatably supporting said guide roller is slidably inserted into said roller shaft inserting hole, an elastic member is interposed between the arm member extended at the side of the roller shaft secured to said roller shaft and said guide roller mounting portion, said arm member is clamped to said guide roller mounting portion by a roller height regulating screw engaged with said threaded hole to mount said guide roller.

11. The tape loading device according to claim 1, wherein said first drive mechanism is provided under said guide rail member, and comprises a first loading ring coupled with said first movable member, and first means for applying rotary force to the first loading ring.

12. The tape loading device according to claim 11, wherein said first drive mechanism further comprises a first coupling mechanism having a slide member supported movably in the circumferential direction with respect to said first loading ring, a first spring for applying tensile force to the rotating direction of said first loading ring with respect to the slide member, and a wire member for coupling between said slide member and said first movable member.

13. The tape loading device according to claim 1, wherein said second drive mechanism is provided under said guide rail member, and comprises a second loading ring coupled with said second movable member, and second means for applying rotary force to said second loading ring.

14. The tape loading device according to claim 13, wherein said second drive mechanism further comprises a second coupling mechanism having a rotary arm rotatably supported by said second loading ring, a slide arm slidably supported by the rotary arm, and a second spring for applying tensile force so that the engagement of the rotary arm with the slide arm becomes always compressed direction with respect to the rotary arm and the slide arm, and said slide arm engaged with said movable member.

* * * * *